Feb. 12, 1935.  F. A. SMITH  1,991,180
TIRE LOCK
Filed Sept. 16, 1929
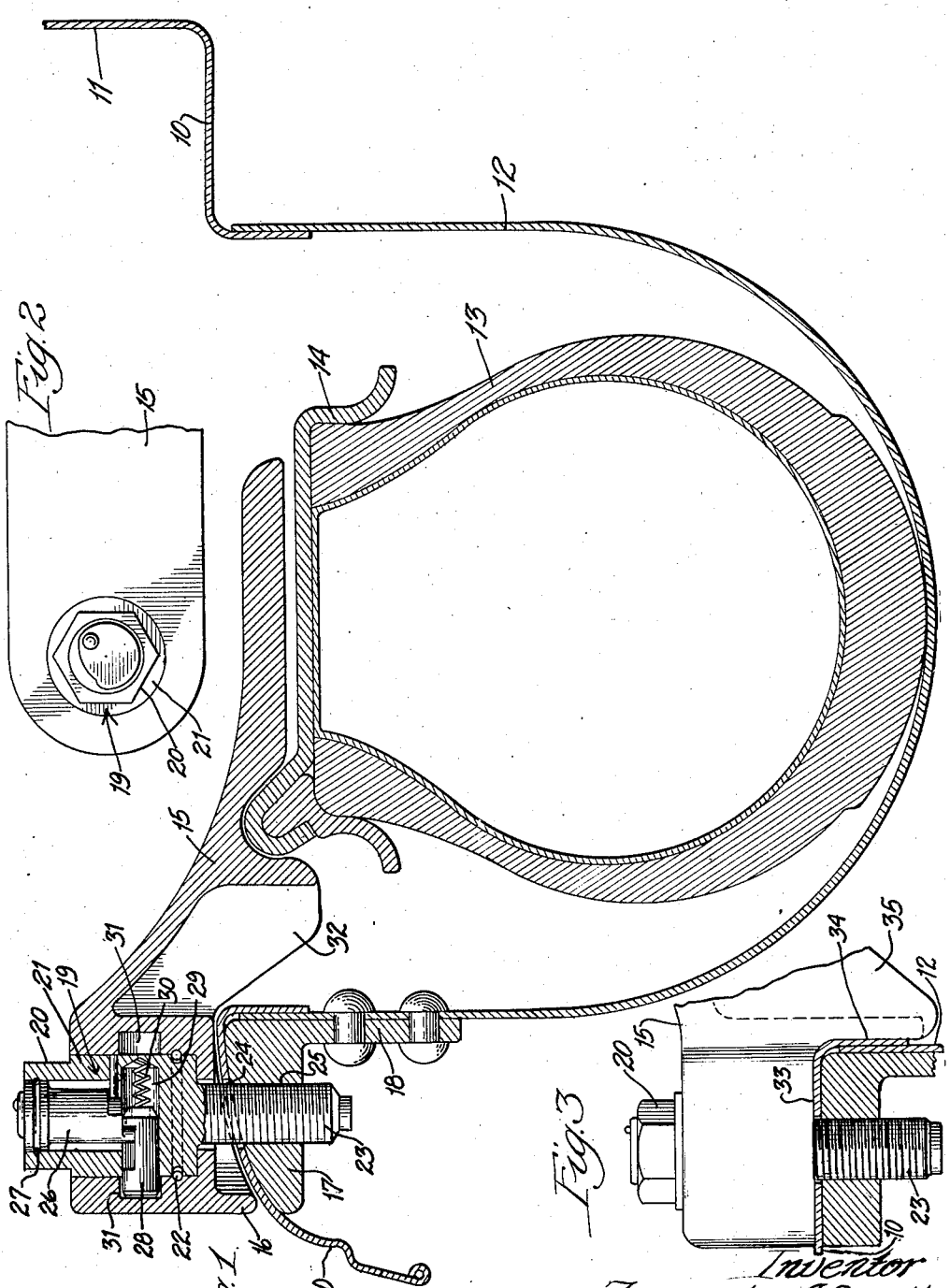
Inventor
Fredrick A. Smith,
By Banning + Banning
Attys Patented Feb. 12, 1935

1,991,180

UNITED STATES PATENT OFFICE 1,991,180

TIRE LOCK

Fredrick A. Smith, Detroit, Mich., assignor, by mesne assignments, to Oakes Products Corporation, Detroit, Mich., a corporation of Michigan Application September 16, 1929, Serial No. 393,058

13 Claims. (Cl. 70—90)

This invention relates to tire locks, and particularly to locks for tires which are mounted upon a well in the front fender of an automobile, or in other similar location.

According to the present invention, I mount upon a seat at the edge of such a well a locking member which extends substantially over said well so as to prevent removal of the tire therefrom. The locking member may suitably be mounted upon said seat by means of a bolt, rotatably mounted in said locking member. Said bolt is chambered to receive a lock cylinder which is adapted to control a bolt which may be caused to engage openings in said locking member to prevent rotation of said bolt.

The invention will readily be understood from the following description taken in conjunction with the accompanying drawing, in which Figure 1 is a transverse section of a tire, fender well, locking member and associated parts;

Fig. 2 is a detailed plan of the outer end of the locking member; and

Fig. 3 is a sectional detail showing a modified form of seat of the locking member.

Referring to the drawing, the numeral 10 designates the fender, which gives into the apron 11. A well 12 is formed in the fender 10 in known manner, and in said well is received a tire 13 mounted upon a rim 14. The upper side of the lowest part of the rim 14 is engaged by a locking member 15, which extends substantially across the well 12 so as to prevent the removal of the tire and rim therefrom.

The locking member 15 is mounted at one edge of the well 12, for example, the outer edge as shown in Fig. 1. At its mounted end, the locking member 15 is provided with a seat 16 which conforms to the shape of a fender, and enables the locking member to be firmly seated thereupon. The underside of the fender 10 is provided with a reinforcing member 17 which is opposed to the seat 16, and is adapted to prevent deformation of the fender owing to operative contact therewith. Said reinforcing member 17 may suitably be provided with a flange 18 by which it is riveted, or otherwise suitably attached to the wall of the well 12.

The locking member 15 is adapted to be retained in position by means of a bolt member designated generally by the numeral 19. Said bolt member comprises a nut portion 20 which is adapted to be engaged by a suitable tool. As shown in the drawing, the nut portion 20 may be hexagonal in shape so as to be engaged by a wrench. Said nut portion 20 is integral with a cylindrical portion 21, which is rotatably mounted in a chamber in said locking member 15 and, if desired, may be permanently retained therein, for example, by means of the locking ring 22.

The bolt member 19 also comprises a threaded stem portion 23 which is adapted to be passed through an opening 24 in the fender into a vertical threaded opening 25 in the reinforcing member 17. The nut portion 20 and cylindrical portion 21 are chambered to receive a lock barrel 26 rotatably mounted therein, and permanently attached thereto by means of a locking ring 27. The barrel 26 actuates a bolt 28 which is slidably mounted in a bore 29 in the cylindrical portion 21 of the bolt member 19 at the base of the chamber therein. A spring 30 is adapted to press the bolt outwardly, and causes same to enter one of the openings 31 in the locking member 15 when opposed thereto and when such movement is permitted by the position of the lock barrel 26.

In operation the lock barrel 26 is unlocked by a key in the usual manner to cause retraction of the bolt 28. The bolt member 19 may now be rotated by means of a wrench co-operating with the hexagonal portion 20, and thereby the locking member 15 may be removed from, or firmly seated in position upon the edge of the well.

When the locking member 15 is mounted in operative position to engage the rim 14, as shown in Fig. 1, and the bolt member 19 is screwed home so as to cause the seat 16 to rest firmly upon the fender at the edge of the well 12, the cylinder 26 is actuated by the key to release the bolt 28. If said bolt is opposed to one of the openings 31, it will enter same; if not so opposed, a slight rotation of the nut portion 20 will bring same into register and cause the bolt member 19 to become locked to the locking member 15 and effectively prevent rotation thereof.

It will be understood that the cooperation between the seat 16 and the edge of the well 12 is such that rotation of the bar 15 is effectively prevented when the bolt member 19 is screwed home. Thus, in the form shown in Fig. 1, rotation of the bar 15 is prevented by the generally oblique form of the seat 16 and contacting part of the fender 10 relative to the bolt member 19. The portion 32 of the bar 15 being located within the well 12 also prevents rotation thereof relative to the bolt member 19.

In the modified form shown in Fig. 3 the seat of the locking member 15 is substantially rectangular in shape comprising a horizontal surface 33 which is adapted to bear upon the upper surface of the fender adjacent the well 12, and a vertical surface 34 adapted to engage the vertical side wall of said well, the surface 34 being formed upon an extension 35 of the bar 15 which extends downwardly into the well. It will be understood that any other form of seat may be employed which will prevent rotation when firmly held in position by the bolt member 19.

I claim:

1. In combination in a spare tire lock structure, a fender having a spare tire supporting well, a locking arm adapted to seat at its outer end directly on top of said fender adjacent one edge of said well and to project only partially across said well into locking engagement with a tire therein, and means for detachably locking said arm against rotary or vertical displacement.

2. In combination in a spare tire lock construction, a fender having a spare tire receiving well, a locking arm applicable at its outer end directly to the upper side of said fender to project only partially across said well for locking engagement with a tire rim in said well, a strengthening member secured to said fender below the point of application of said locking arm, and locking means contained in said arm and adapted for detachable engagement with said strengthening member to rigidly lock said arm in locking position.

3. In combination in a spare tire lock structure, a fender having a well for receiving a spare tire, a locking arm for seating at its outer end directly on said fender at one edge of said well to project only partially across said well into locking position over a tire, a reenforcing and supporting member secured against the underside of said fender at the point of application of said arm to the fender, a locking bolt for said locking arm having a head rotatable in the arm and a threaded shank for engaging said strengthening member, and means within the bolt head for locking said bolt to the arm against relative rotation.

4. In combination in a spare tire lock structure, a fender having a well for receiving a spare tire, a locking arm for extending only partially across said well in locking position over a spare tire therein, a supporting head for said arm having a seating base conforming to the curvature of said fender at one edge of said well whereby said head will intimately engage against the upper side of said fender, a locking bolt rotatable within said head for locking said arm in locking position, and a lock within said bolt for locking said bolt against retraction after securing of the arm to the fender.

5. In combination in a spare tire lock construction, a fender having a well for receiving a spare tire, a locking arm, and means for detachably locking said arm with one end thereof directly against said fender at one edge of said well and with the other end of the arm projecting into the well for locking a spare tire in the well.

6. The combination with a fender having a depending skirt along its outer edge and a well inside of said skirt for receiving a spare wheel or tire, a supporting fitting secured to said well below said skirt, and a locking member detachably secured at its outer end to said fitting and extending into said well over the rim of a spare wheel or tire in said well.

7. The combination with a fender having a depending skirt along its outer edge and a well inside of said skirt for receiving a spare tire or wheel, a supporting and strengthening fitting secured to the wall of the well below said skirt and engaging against the underside of the skirt, and a locking member detachably supported by said fitting to extend into said well over the lower part of the rim of a spare tire or wheel in said well.

8. The combination with a fender structure having a depending skirt along its outer edge and a well inside of said skirt for receiving a spare tire or spare wheel, a fitting secured to the fender structure below said skirt, a locking member, and key controlled lock means for detachably securing said locking member at its outer end to said fitting with the inner end of the arm projecting into the well to be above the rim of a spare wheel or tire within the well.

9. In a motor vehicle, a fender well adapted to receive a spare tire characterized by lock controlled means extending into the open space of the well and below the top thereof, to prevent unauthorized removal of a tire therefrom.

10. In a motor vehicle, a fender well to receive a spare tire, characterized by lock controlled means associated with the well and having a dependent foot extending into the space adjacent one side of the well opening to prevent removal of a tire therefrom.

11. In a motor vehicle, a tire receiving well characterized by lock controlled means positioned at one side of the well and provided with a lateral foot whose free end extends adjacent the inner periphery of the tire to prevent removal of the tire from the well.

12. In a motor vehicle, a fender provided with a tire receiving well characterized by a retainer arm carried at one side of the well and having its free end extending adjacent the inner periphery of the tire to retain the tire in the well, and means to lock said arm against unauthorized movement from its tire retaining position.

13. A fender well tire lock mechanism comprising the fender of a vehicle, a well therein for the reception of the lower arc of a spare tire and rim, a first threaded member fixed on the fender at the side of the well, an arm removably extending over the arc of the tire rim to preclude its being lifted from the well, a second threaded member having threaded engagement with the first threaded member, a lock for locking the arm on one of said members against removal from its said extending position, and structure engageable when the arm, the last mentioned member and the lock are in assembled relation, for relatively threading the members to clamp the arm against the rim.

FREDRICK A. SMITH.